Figure 1:
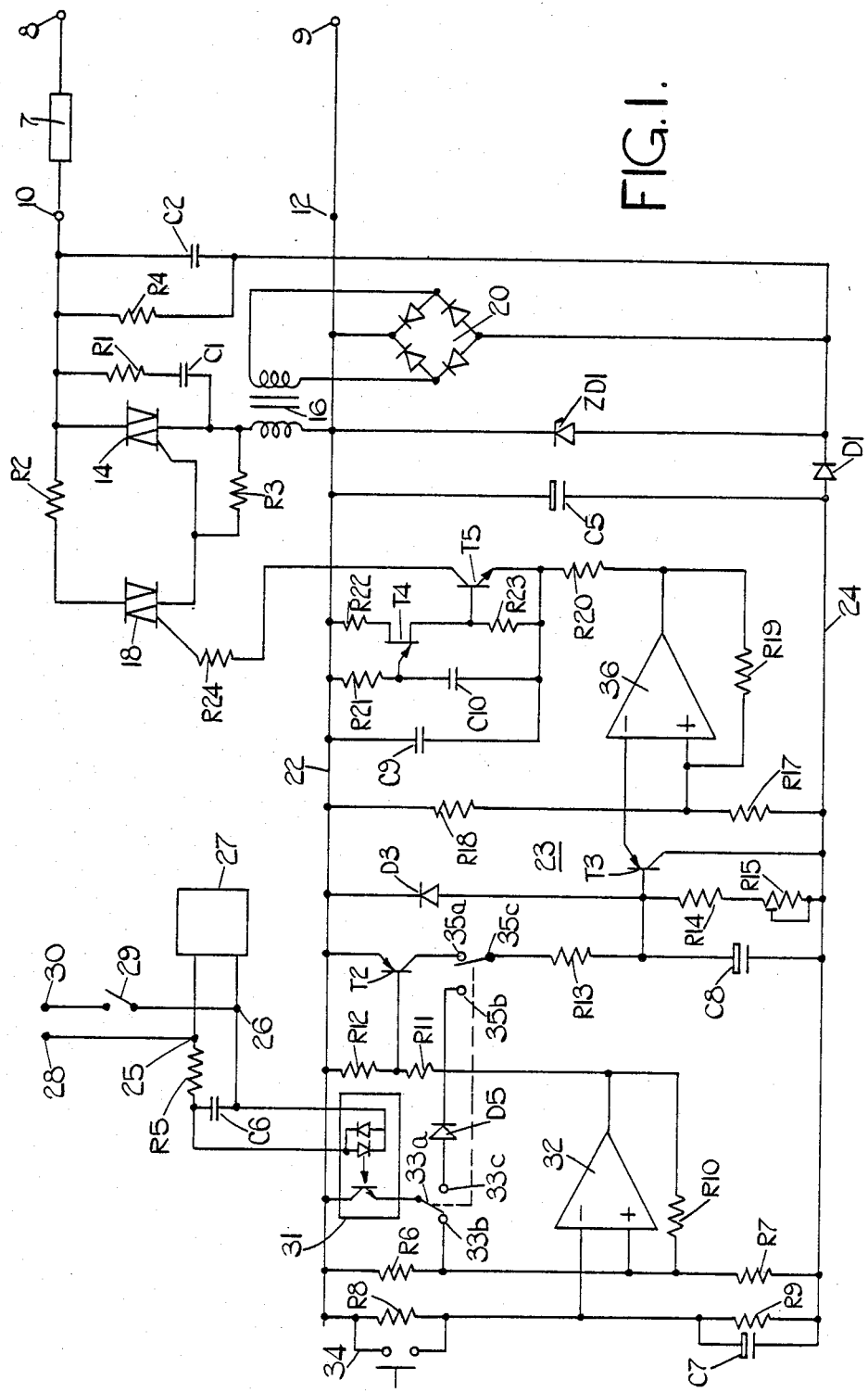

United States Patent [19]

Dytch

[11] 4,369,377

[45] Jan. 18, 1983

[54] CURRENT CONTROL DEVICE

[75] Inventor: Anthony Dytch, Rugeley, England

[73] Assignee: Allen-Martin Electronics Limited, England

[21] Appl. No.: 345,766

[22] Filed: Feb. 4, 1982

Related U.S. Application Data

[63] Continuation of Ser. No. 235,760, Feb. 18, 1981, abandoned.

[30] Foreign Application Priority Data

Feb. 23, 1980 [GB] United Kingdom ............... 8006200
Feb. 23, 1980 [GB] United Kingdom ............... 8006201

[51] Int. Cl.³ ................. H01H 35/00; H01H 9/54; H05B 37/02

[52] U.S. Cl. ..................... 307/117; 307/118; 307/140; 307/157; 307/246; 315/209 R; 315/360

[58] Field of Search ............... 307/117, 118, 139, 140, 307/157, 246; 315/209 R, 209 SC, 360

[56] References Cited

U.S. PATENT DOCUMENTS 3,459,961 8/1969 Rareas .................. 307/157 X
3,940,660 2/1976 Edwards ................ 315/360

FOREIGN PATENT DOCUMENTS 2509527 9/1976 Fed. Rep. of Germany .
2293781 7/1976 France .

Primary Examiner—Michael L. Gellner

[57] ABSTRACT

A current control device for connection in series with an AC load where it is not convenient to make connections in parallel with the load. The device comprises a pair of terminals for connection in series with an AC load, a triac for controlling the flow of current through the load, and a control circuit for controlling the triac. A circuit for supplying current to power supply rails when current is flowing through the load comprises a transformer having a primary winding connected in series with the terminals, and a secondary winding connected across the input of a rectifier, the output of which is connected across the supply rails. A circuit for supplying power to the rails when the flow of current through the load is prevented comprises a resistor bridged by a capacitor connected in series with a zener diode between the terminals, a rectifying diode and a smoothing capacitor.

9 Claims, 2 Drawing Figures

CURRENT CONTROL DEVICE

This is a continuation of application Ser. No. 235,760, filed Feb. 18, 1981, now abandoned.

This invention relates to a current control device for connection in series with an AC load for permitting or preventing flow of load current.

A known current control device includes a switch means connected in series with the load, a circuit for controlling the switch means, and a power supply circuit for the control circuit connected in parallel with the load. Such a circuit may only be used where it is possible to connect the power supply circuit in parallel with the load.

It is accordingly an object of this invention to provide a new current control device in which the abovementioned disadvantage is overcome.

According to this invention there is provided a current control device comprising first and second terminals for connection in series with an AC load, switch means connected between said terminals for permitting or preventing flow of load current, a circuit for controlling the switch means, a pair of power supply rails for the control circuit, and a circuit connected between said terminals for providing power to said supply rails when a load current is flowing between said terminals.

By providing a circuit connected between the terminals for providing power to the supply rails when load current is flowing, the current control device of this invention may be used where it is not possible to connect the power supply circuit in parallel with the load.

Figure 2:
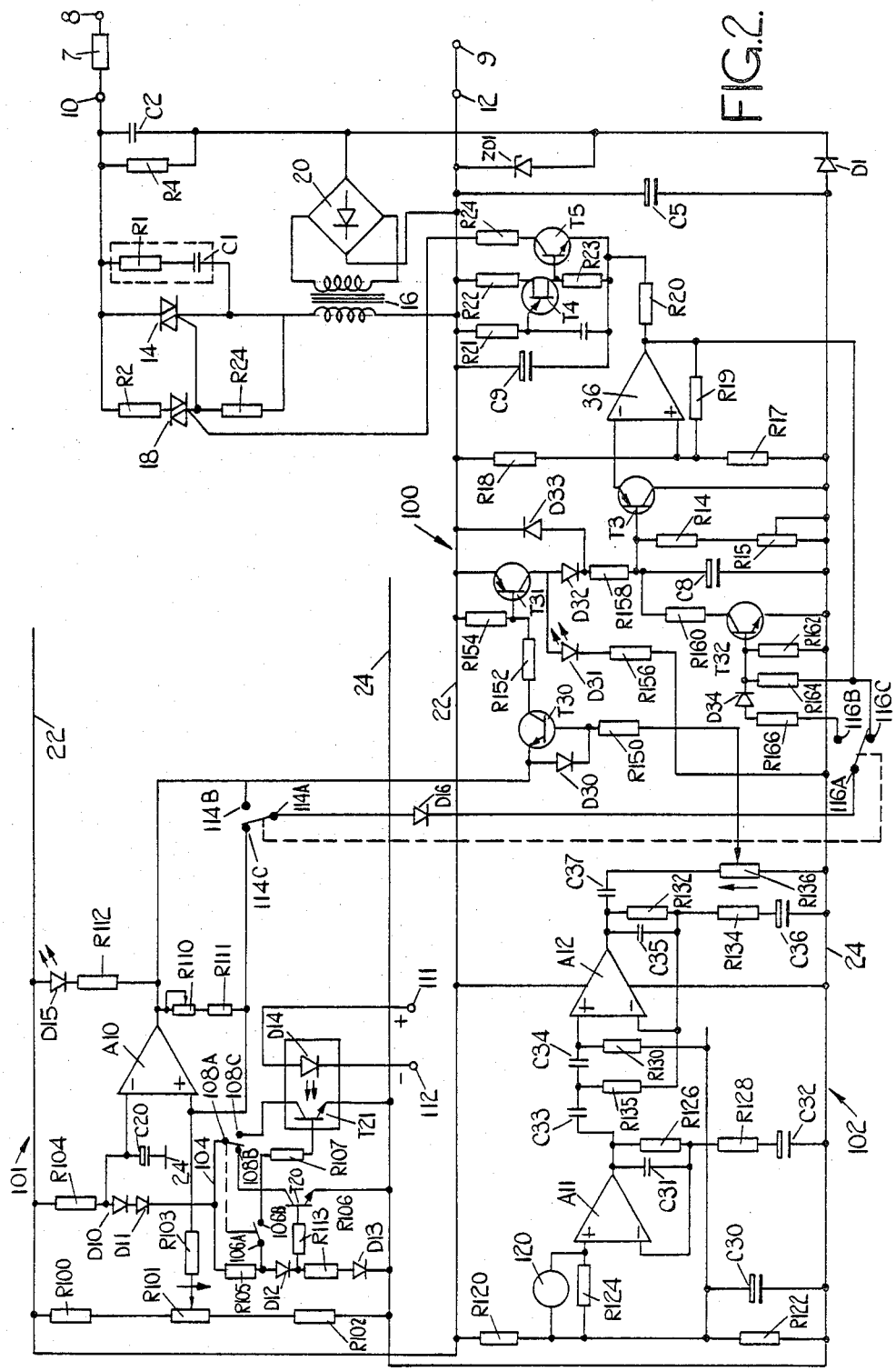

This invention will now be described in more detail by way of example with reference to the accompanying drawings in which:

FIG. 1 is a circuit diagram of a current control device embodying this invention; and FIG. 2 is a circuit diagram of a lighting system control device embodying this invention.

Referring now to FIG. 1, there is shown a device for controlling current flow to a classroom lighting system 7 which receives power from a pair of mains terminals 8 and 9. The device comprises first and second terminals 10 and 12 which are connected between the lighting system 7 and the mains terminal 9 in place of a conventional switch. The terminal 10 is connected through switch means in the form of a triac 14 and also through the primary winding of a transformer 16 to the terminal 12. Resistor R1 and a capacitor C1 are connected in series across the triac 14 and function as a suppressor. Terminal 10 is also connected through a resistor R2, a triac 18 and a resistor R3, connected in series, to the junction of triac 14 and the primary winding of the transformer 16, and the junction of triac 18 and resistor R3 is also connected to the gate electrode of triac 14.

The secondary winding of transformer 16 is connected across the input terminals for rectifier 20, the positive output terminal of which is connected to a positive supply rail 22 and the negative output terminal of which is connected to the cathode of a diode D1, the anode of diode D1 being connected to a negative supply rail 24.

Terminal 12 is also connected to the cathode of a zener diode ZD1, the anode of which is connected to the cathode of diode D1 and also through a capacitor C2 and resistor R4, connected in parallel, to terminal 10. A smoothing capacitor C5 is connected between rails 22 and 24. The rails 22 and 24 supply power to a control circuit 23 for the triacs 14 and 18 as will now be described.

The control circuit comprises a pair of terminals 25 and 26 which are connected across the input of an electric bell 27, the terminal 25 being connected to a mains supply terminal 28 and the terminal 26 being connected through the switch 29, which may be operated by a clock mechanism, to a mains supply terminal 30. Terminals 25 and 26 are connected together by a resistor R5 and a capacitor C6 connected in series. The capacitor C6 is connected across the input terminals of a General Electric type H11AA1 opto isolator, the positive output terminal of which is connected to the supply rail 22 and the negative output terminal of which is connected to the single pole 33A of a double throw switch having a pair of contacts 33B and 33C. The contact 33B is connected to the junction of a pair of resistors R6 and R7 connected in series between rails 22 and 24. The junction of resistors R6 and R7 is also connected to the non-inverting input of a type LM358 operational amplifier, the inverting input of which is connected to the junction of a pair of resistors R8 and R9 connected in series between rails 22 and 24. Resistor R8 is bridged by a normally open push button switch 34 and resistor R9 is bridged by a capacitor C7. The output of amplifier 32 is connected through a resistor R10 to its non-inverting input, and through a pair of resistors R11 and R12, connected in series, to rail 22. The junction of resistors R11 and R12 is connected to the base of a PNP transistor T2, the emitter of which is connected to the rail 22 and the collector of which is connected to a contact 35A of a single pole double throw switch which also includes a contact 35B and a pole 35C. The pole 35C is ganged to the pole 33A. Contact 35B is connected to the cathode of a diode D5, the anode of which is connected to the contact 33A. The pole 35C is connected through a resistor R13 and a capacitor C8, connected in series, to rail 24. The junction of resistor R13 and capacitor C8 is connected through a resistor R14 and a preset resistor R15 to the rail 24, and also to the base of a PNP transistor T3, the collector of which is connected to the rail 24. The base of transistor T3 is also connected to the anode of a diode D3, the cathode of which is connected to rail 22. The emitter of transistor T3 is connected to the inverting input of a type LM 358 amplifier 36, the non-inverting input of which is connected to the junction of a pair of resistors R17 and R18 connected in series between the rails 22 and 24. The output of amplifier 36 is connected through a resistor R19 to its non-inverting input.

The output of amplifier 36 is connected through a resistor R20 and a capacitor C9 to rail 22, a resistor R21 and a capacitor C10 being connected across the capacitor C9. The junction of resistor R21 and capacitor C10 is connected to the emitter of a uni-junction transistor T4, the second base of which is connected through a resistor R22 to the rail 22 and the first base of which is connected through a resistor R23 to the junction of capacitor C9 and resistor R20. The first base of transistor T4 is also connected to the base of an NPN transistor T5, the emitter of which is connected to the junction of capacitor C9 and R20. The collector of transistor T5 is connected through a resistor R24 to the gate electrode of triac 18.

The operation of the current control device shown in FIG. 1 will now be described.

The control device shown in FIG. 1 has two modes of operation. In the first mode of operation, the poles 33A and 35C are in contact, as shown, respectively with contacts 33B and 35A, and in the second mode of operation the poles 33A and 35C are in contact respectively with contacts 33C and 35B.

In both modes of operation, initially with triacs 14 18 switched off, current flow to the lighting system will be prevented. In this condition, current will flow between terminals 10 and 12 through resistor R4, capacitor C2 and zener diode ZD1. Consequently, a square wave will be present across the anode and cathode of zener diode ZD1 and this will be rectified by the diode D1 to provide power to the supply rails 22 and 24. Thus, resistor R4, capacitor C2 and zener diode ZD1 together with diode D1 form a circuit for providing power to the supply rails 22 and 24 when there is no load current flowing between terminals 10 and 12.

In the first mode of operation, if the switch 34 is depressed, the output of amplifier 32 will go low thereby switching on transistor T2 and charging capacitor C8. This will cause the output of amplifier 36 to go low thereby causing capacitor C10 to be repetitively charged through resistor R21 and discharged through uni-junction transistor T4 with the result that a train of narrow pulses will be supplied to the gate electrode of triac 18. Triac 18 will consequently be fired at an early stage of each half cycle thereby firing triac 14 and permitting current to flow between terminals 10 and 12 and thus energising the lighting system.

With the load current flowing in the lighting system, the primary winding of transformer 16 will be energised thereby energising the secondary winding and supplying power to the input terminals of the rectifier 20. Rectifier 20 will in turn supply power to the rails 22 and 24. Thus, in this condition, the transformer 16 and rectifier 20 comprise a circuit for supplying power to the supply rails 22 and 24.

If the bell associated with terminals 25 and 26 is now energised by closing switch 29, as may be the case at the end of a classroom period, the supply rail 22 will be connected to the junction of resistors R6 and R7 through the output of opto isolator 31 thereby causing the output of amplifier 32 to go high. Consequently, transistor T2 will be rendered non-conductive with the result that capacitor C8 will discharge through resistors R14 and R15. At the end of a delay determined by the values of capacitor C8, resistor R14 and resistor R15, and which may conveniently be between five and fifteen minutes, the output of amplifier 36 will go high. This will prevent pulses being supplied to the gate electrode of triac 18 with the result that the load current will be prevented from flowing between terminals 10 and 12 and so the lighting system will be de-energised.

In the second mode of operation, as will now be explained, energisation of the bell 27 causes energisation of the lighting system so in this case the lighting system would normally be a corridor lighting system. Initially, if with triacs 14 and 18 non-conducting, the bell 27 is energised, as may be the case at the end of a classroom period, the rail 22 is connected through the output of opto isolator 31 to the anode of diode D5 thereby charging capacitor C8 and thus energising the lighting system. The lighting system will then remain energised whilst the capacitor C8 discharge through resistors R14 and R15 for a period which is determined by the values of capacitor C8 and resistors R14 and R15.

Although the current control device has been described with reference to a lighting system, it is to be appreciated that it is suitable for controlling current flow to any load where parallel connections are inconvenient as it is required to have access to only one of the power supply rails.

Referring now to FIG. 2, there is shown a control device for a classroom lighting system 7 and as part of the circuit diagram for this device is identical to the circuit diagram of the device shown in FIG. 1 like components have been denoted by like reference numerals. In particular, this device includes triacs 14 and 18, the transformer 16 and rectifier 20, the capacitor C5 and the diode D1 and other associated components. In addition, this device includes a control circuit 100 which includes the transistor T3, amplifier 36, and transistors T4 and T5 and other associated components. This device also includes a light level detecting means 101 and a sound level detecting means 102 and these will now be described.

The light level detecting means 101 comprises three resistors R100, R101 and R102 connected in series between the rails 22 and 24. A tapping of resistor R101 is connected through a resistor R103 to the non-inverting input of a type LM358 operational amplifier A10. The inverting input of amplifier A10 is connected through a capacitor C20 to the rail 24 and through a resistor R104 to the rail 22. This inverting input is also connected to the anode of a diode D10, the cathode of which is connected to the anode of a diode D1 and the cathode of which is connected to a rail 104. The rail 104 is connected through a resistor R105 to the anode of a diode D12, the cathode of which is connected through a resistor R106 to the anode of a diode D13 and the cathode of which is connected to the rail 24. The cathode of diode D12 is connected through a resistor R113 to the base of a Litronix type LPT100 phototransistor T20. The phototransistor T20 is positioned inside a classroom and arranged to sense the light level. The emitter of transistor T20 is connected to the rail 24. The junction of resistor R105 and diode D12 is connected to the single pole 106A of a single throw switch having a contact 106B. The contact 106B is connected through a resistor R107 to the base of a phototransistor T21 which together with a light emitting diode D14 forms a General Electric type H11B2 opto isolator. The emitter of transistor T21 is connected to the rail 24. The rail 104 is also connected to the single pole 108A of a double throw switch having contacts 108B and 108C. The poles 106A and 108A are ganged as indicated. The contact 108B is connected to the collector of transistor T20 and the contact 108C is connected to the collector of transistor T21. The anode and cathode of diode D14 are connected respectively to a pair of terminals 111 and 112 which are provided for connection to an external light sensor.

The output of amplifier A10 is connected to its non-inverting input through a preset resistor R110 and a further resistor R111 and also through a resistor R112 to the cathode of a light emitting diode D15, which is provided as an indicator and the anode of which is connected to the rail 22. The output of amplifier A10 is also connected to a contact 114B forming part of a single pole double throw switch having a pole 114A and a further contact 114C. The contact 114C is connected to the non-inverting input of amplifier A10 and the pole 114A is connected to the anode of a diode D16. The cathode of diode D16 is connected to the single pole 116A of a double throw switch having further contacts 116B and 116C. The poles 114A and 116A are ganged together as indicated.

The sound level detecting means includes a pair of resistors R120 and R122 connected in series between the rails 22 and 24 with the resistor R122 bridged by a capacitor C30. The junction of resistors R120 and R122 is connected through a microphone 120 positioned to sense the sound level in the classroom to the non-inverting input of a type LM358 operational amplifier A11. The microphone 120 is bridged by a resistor R124. The output of amplifier A11 is connected through a resistor R126 bridged by a capacitor C31, a resistor R128, and a capacitor C32 to the rail 24. The junction of resistors R126 and R128 is connected to the inverting input of amplifier A11. The output of amplifier A11 is connected through a capacitor C33 and a further capacitor C34 to the non-inverting input of a type LM358 operational amplifier A12, the non-inverting input of which is connected through a resistor R130 to the junction of resistors R120 and R122. The output of amplifier A12 is connected through a resistor R132 bridged by a capacitor C35, a resistor R134 and a capacitor C36 connected in series, to the rail 24, and the junction of resistors R132 and R134 is connected to the inverting input of amplifier A12. The inverting input of amplifier A12 is also connected through a resistor R135 to the junction of capacitors C33 and C34. The output of amplifier A12 is connected through a capacitor C37 and a resistor R136 to rail 24, and a tapping of resistor R136 forms the output of the sound level detection means.

The resistor R126, capacitor C31, resistor R128 and capacitor C32 together with the resistor and capacitor associated with the amplifier A12 form a filter section which has a fifth order characteristic below 500 Hz and a second order characteristic above about 10 kHz thereby providing attenuation of low and high frequencies. Low frequency attenuation is provided so that the device is insensitive to low frequency sounds such as passing vehicles and high frequency attenuation is provides so that it is sensitive to sounds above the audio frequency band.

The control circuit 100 includes an NPN transistor T30, the base emitter path of which is bridged by a protection diode D30, the emitter of which is connected to the output of amplifier A10 and the base of which is connected through a resistor R150 to the tapping of resistor R136. The collector of transistor T30 is connected through a pair of resistors R152 and R154 connected in series to the rail 22, and the junction of resistors R152 and R154 is connected to the base of a PNP transistor T31. The emitter of transistor T31 is connected to the rail 22 and the collector is connected to the anode of a light emitting diode D31 provided as an indicator, and the cathode of diode D31 is connected through a resistor R156 to rail 24. The collector of transistor T31 is connected to the anode of a diode D32, the cathode of which is connected through a resistor R158 to the base of transistor T3. The cathode of diode D32 is also connected through a protection diode D33 to rail 22. The base of transistor T3 is connected to a resistor R160 to the collector of an NPN transistor T32, the emitter of which is connected to the rail 24 and the base of which is connected through a resistor R162 to rail 24. The base of transistor T32 is also connected through a resistor R164 to contact 116C and also to the output of amplifier 36. The base of transistor T32 is also connected to the cathode of a diode D34, the anode of which is connected through a resistor R166 to a contact 116B.

The current control device shown in FIG. 2 has three modes of operation. In the first mode of operation, the switch 106A, 106B is open and the pole 108A engages the contact 108B so that amplifier A10 is responsive to the phototransistor T20 positioned in the classroom. Also in this mode of operation, the pole 114A engages the contact 114C and the pole 116A engages a contact 116C. In this mode of operation, if with the lighting system 7 initially de-energised, the light level as sensed by the phototransistor T20 falls below a predetermined level, the output of amplifier A10 goes low thereby providing a low signal at the emitter of transistor T30. The sound sensed by the microphone 120 causes the AC signal to be applied to the base of transistor T30, and providing the sound level exceeds a predetermined value, the capacitor C8 will charge with the result that the output of amplifier 36 will go low thereby energising the lighting system.

Thus, providing the light level is below a predetermined value and the sound level exceeds a predetermined value, the lighting system is energised.

As a result of the output of amplifier 36 going low, the non-inverting input of amplifier A10 is held low thereby holding the output of this aplifier low irrespective of the lighting level. If the sound level falls below a predetermined level, which would be lower than the level required to cause the output of amplifier 36 to go low, the rate at which capacitor CS discharges through resistors R14 and R15 will exceed the rate at which it is charged through resistor R158 and after a delay period the output of amplifier 36 will go high thereby de-energising the lighting system.

Thus, the lighting system is energised when the light level is below a predetermined value, which will be the case on dark days, and when the sound level rises above a predetermined level which will normally be caused by the presence of a class in the classroom. Subsequently, if the sound level falls below a predetermined level which will occur when the class leaves the classroom, the lighting system will be de-energised after a delay period.

In the second mode of operation, the switch 106A, 106B is closed and the pole 108A engages the contact 108C with the result that the amplifier A10 is rendered responsive to the external sensor connected across terminals 111 and 112. Also in this mode, the pole 114A engages the contact 114B and the pole 116A engages a contact 116B. In this mode of operation, if with the lighting system initially de-energised, the light level is sensed by the external sensor falls below a predetermined level so that the output of amplifier A10 goes low and the sound level exceeds the predetermined level mentioned above, the lighting system will be energised. Subsequently, if the sound level falls below a predetermined level, as before the output of amplifier 36 will go high after a delayed period thereby deenergising the lighting system. If the light level as sensed by the external sensor rises above the predetermined level, which will be higher than the predetermined level which was necessary to cause the output of amplifier A10 to go low, the output of amplifier A10 will go high thereby rendering the transistor T32 conductive, discharging the capacitor C8 and immediately de-energising the lighting system.

In the third mode of operation the switch 106A, 106B is closed, pole 108A engages contact 108C, and pole 114A engages contact 114C so that the system is sensitive to the external light level sensor until the lighting system 7 is energised.

Although the current control device shown in FIG. 2 has been described with reference to a classroom lighting system it is to be appreciated that this circuit is suitable for use in other places where people congregate.

Both of the current control devices described above are capable of operating at low load currents and this is possible due to the low currents required by the control circuits 23 and 100, the detecting means 101 and 102 and by using narrow pulses to fire triac 14. At higher load currents, the excess current flowing in the secondary winding of transformer 16 has a return path through zener diode ZD1. A typical load current operating range is 0.5 A to 5 A.

I claim:

1. A current control device comprising first and second terminals for connection in series with an AC load, switch means connected between said terminals for permitting or preventing flow of load current, a circuit for controlling the switch means, a pair of power supply rails for the control circuit, a first circuit connected between said terminals for providing power to said supply rails when load current is flowing between said terminals, a second circuit connected between said terminals for providing power to said supply rails when flow of load current between said terminals is prevented, light level detecting means, and means for detecting the presence of persons, the control circuit being responsive to the light level detecting means and the person detecting means for controlling the switch means.

2. A current control device as claimed in claim 1 in which the person detecting means comprises sound level detecting means.

3. A current control device as claimed in claim 2 in which the control circuit renders the switch means conductive when the sound level exceeds a first predetermined value with the light level below a second predetermined value.

4. A current control device as claimed in claim 3 in which the control circuit renders the switch means non-conductive when the sound level falls below a third predetermined level.

5. A current control device as claimed in claim 1 in which the first power supply circuit comprises a transformer having a primary winding and a secondary winding and a full wave rectifier, the primary winding being connected in series with the switch means, the secondary winding being connected across the input of the rectifier, and the output of the rectifier being connected to the supply rails.

6. A current control device as claimed in claim 1 in which the second power supply circuit comprises voltage reduction means connected between the terminals and diode means connecting the output of the voltage reduction means to the power supply rails.

7. A current control device comprising first and second terminals for connection in series with an AC load, switch means connected between said terminal for permitting or preventing flow of load current, a circuit for controlling the switch means, a pair of power supply rails for the control circuit, a first circuit connected between said terminals for providing power to said supply rails when load current is flowing between said terminals and a second circuit connected between said terminals for providing power to said supply rails when flow of load current between said terminals is prevented, said second power supply circuit comprising voltage reduction means connected between the terminals and diode means connecting the output of the voltage reduction means to the power supply rails.

8. A current control device as claimed in claim 7 in which the voltage reduction means comprises impedance means and a zener diode connected in series between the terminals, the anode and cathode of the zener diode being connected through the diode means to the supply rails.

9. A current control device comprising first and second terminals for connection in series with an AC load, switch means connected between said terminals for permitting or preventing flow of load current, a circuit for controlling the switch means, a pair of power supply rails for the control circuit, a first circuit connected between said terminals for providing power to said supply rails when load current is flowing between said terminals and a second circuit connected between said terminals for providing power to said supply rails when flow of load current between said terminals is prevented, said first power supply comprising a transformer having a primary winding and a secondary winding and a full wave rectifier, the primary winding being connected in series with the switch means, the secondary winding being connected across the input of the rectifier, and the output of the rectifier being connected to the supply rails.

* * * * *